United States Patent
Blankenship et al.

[19]

[11] Patent Number: 5,947,654
[45] Date of Patent: Sep. 7, 1999

[54] DRILL/COUNTERSINK NOSEPIECE ASSEMBLY

[75] Inventors: Thomas O. Blankenship; James L. Morrison, both of O'Fallon; Brian J. Martinek, Moscow Mills; Dan B. Hoelter, Dittmer, all of Mo.

[73] Assignee: McDonnell Douglas Corporation

[21] Appl. No.: 09/060,158

[22] Filed: Apr. 14, 1998

[51] Int. Cl.⁶ .................................................. B23B 49/02
[52] U.S. Cl. ........................... 408/72 B; 408/97; 408/112
[58] Field of Search ........................... 408/72 B, 80–82, 408/97, 112, 241 B

[56] References Cited

U.S. PATENT DOCUMENTS

| | | | |
|---|---|---|---|
| 2,461,716 | 2/1949 | Blatt | 408/112 |
| 2,539,223 | 1/1951 | Bellek | 408/112 |
| 3,060,772 | 10/1962 | Crump | 408/112 |
| 3,874,808 | 4/1975 | Zaccardelli et al. | 408/72 B |
| 4,674,164 | 6/1987 | McCloskey | 384/908 |
| 5,033,917 | 7/1991 | McGlasson et al. | 408/72 B |

FOREIGN PATENT DOCUMENTS 607571   9/1948   United Kingdom ................... 408/112

*Primary Examiner*—Steven C. Bishop
*Attorney, Agent, or Firm*—Alston & Bird LLP

[57] ABSTRACT

The drill/countersink nosepiece assembly of the present invention permits the fabrication of a precise hole and countersink in a structural assembly workpiece in a single operation with the aid of a drill plate or other hole template. The small size of the nosepiece tip enables multiple holes to be closely spaced without interference between drill plate engagement slots. A close fit between the shaft of the rotating drill/countersink bit and the inner surface of the sleeve prevents the bit from wandering upon repeated or heavy use. The drill/countersink nosepiece comprises a combination drill/countersink bit to be received by a drill motor chuck, a bushing to be received by a fixed housing portion of the drill motor, a sleeve telescopically mounted within the bushing, a spring within the bushing to bias the sleeve forward, and fingers or other features at the end of the sleeve for engaging an alignment slot in a drill plate. In operation, the nosepiece is attached to a power feed or hand-held drill motor and tooling slots or other features about the hole template in the drill plate are engaged by the sleeve fingers, which extend longitudinally from the retractable sleeve and lie within the infinite cylinder defined by the outer diameter of the sleeve. The drill/countersink nosepiece is adapted to be mated interchangeably with power feed and hand-held drill motor units.

12 Claims, 3 Drawing Sheets

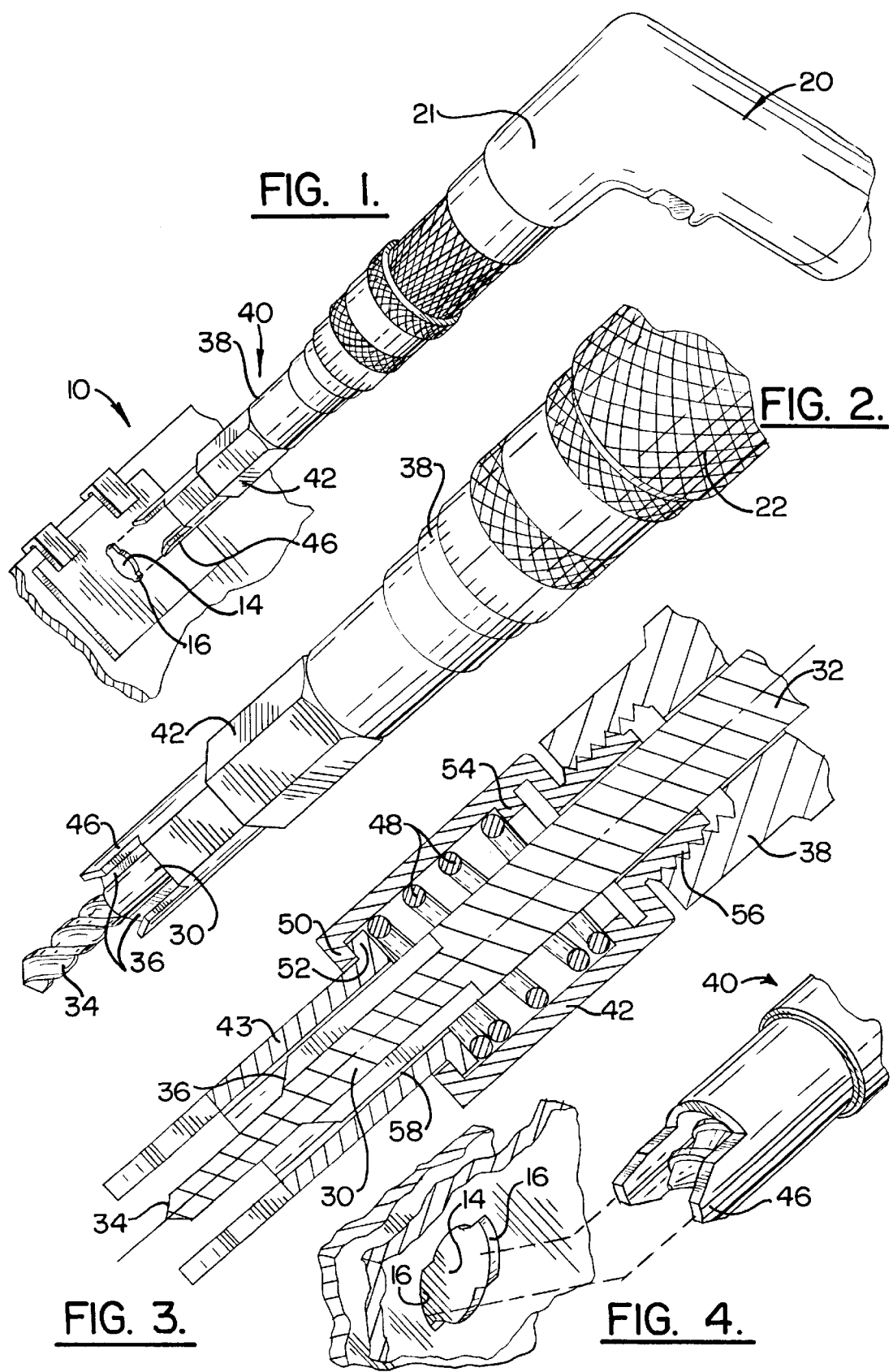

DRILL/COUNTERSINK NOSEPIECE ASSEMBLY

FIELD OF THE INVENTION

The present invention relates to a tool for the fabrication of holes and countersinks in structures, and, more particularly, to a tool which can precisely fabricate a set of tightly spaced holes and countersinks in a single operation and which is adapted for use with a variety of drill motor units.

BACKGROUND OF THE INVENTION

The construction and assembly of equipment such as aircraft and automobiles frequently entails drilling holes to accommodate fasteners in structures and fabricating countersinks in such holes to seat the countersunk heads of low-profile fasteners. It is typically important that such holes and countersinks be located accurately and that they be fabricated precisely. In high-volume fabrication operations requiring the fabrication of large numbers of holes and countersinks, it is often important that the time to accomplish such fabrication operations be minimized so as to minimize cost and that such fabrication operations be repeatable.

It is conventional in the construction and assembly of equipment with many sets of holes and countersinks to drill many holes in succession using a drill bit or other cutting tool in a high-speed drill motor and to fabricate countersinks in such holes with a separate countersinking tool after drilling operations have been completed. Conventional fabrication of sets of holes and countersinks thus conventionally requires a separate tool for hole drilling and for countersink cutting and requires two passes over the structure to perform the separate drilling and countersinking operations. Combination drill tools, such as Boeing tool no. TD90F2 manufactured by Carboro Corporation, comprising a drill bit and a countersink cutting surface on a single bit shaft have been developed in response to the need to fabricate holes and countersinks in a single operation.

It is conventional to perform drilling and other fabrication operations with either standard hand-held drill motor units or with power-feed drill motor units. Hand-held drill motor units can be moved quickly from hole to hole, but the full weight of such units must be supported by the operator and forward drill tool pressure must be supplied by the operator. Hand-held units may therefore induce operator fatigue, especially when drilling a large number of holes through hard materials. In contrast, power-feed drill motor units attach firmly to a tooling fixture, which is in turn attached to the structure in which holes are to be fabricated, and forward pressure to the drill tool is supplied by the power-feed unit to enable controlled, repeatable cutting operations and a reduction in operator fatigue.

Hole drill and countersink cutter tools adapted for use with hand-held drill motor units are often incompatible with power-feed drill motor units, so that separate sets of tooling are often required in operations requiring the use of both hand-held and power-feed drill motors.

It is conventional in the construction and assembly of equipment with many features for complex sets of holes and other features to be fabricated with the aid of a tooling fixture, such as a drill plate. If, for example, multiple identical assemblies must be constructed, such as for multiple wing assemblies on an aircraft production line, a durable, reusable drill plate in which a pattern of holes or features has been formed may be used as a template by which holes and features in each assembly may be accurately and repeatably fabricated. The use of a tooling fixture such as a drill plate helps to ensure that all holes in the assembly are precisely located relative to one another.

The minimum spacing between holes which can be formed by the use of a drill plate and conventional drill and countersink cutting tools is typically controlled by the geometry of a nosepiece assembly which engages the tooling plate in an area around or near the drill to align the drill tool with the hole to be drilled. Conventionally, hand-held and power feed drilling motors mate with the tooling plate, in order to align the drill motor prior to commencing drilling operations, by means of a nosepiece assembly comprising radial spring fingers extending through the tooling plate and engaging the tooling plate from the back side of the tooling plate. The geometry of the nosepiece radial spring finger assembly utilized thus dictates how accurately the holes may be drilled and how closely the holes may be spaced conventionally.

As hand-held and power feed units for drilling and countersinking operations are used repeatedly, the accuracy of hole location and hole size may degrade as cutting tools wander or otherwise diverge from the desired drilling axis relative to the tooling plate engagement location. Frequent tool replacement may thus be necessary with conventional drill and countersink tools in applications requiring accurate hole and countersink size and location.

While conventional tools for the fabrication of holes and countersinks in structures provide considerable utility, (1) such tools are typically quite heavy, (2) the nosepiece of such tools is often bulky, thus limiting the minimum spacing between holes which can be accommodated, (3) hole location and hole size accuracy may degrade with repeated heavy use, and (4) separate tools for hand-held and power feed units may be required. Therefore, while a number of drill and countersink fabrication tools have been developed, it is still desirable to develop improved tooling which does not suffer from such limitations inherent to conventional tooling.

SUMMARY OF THE INVENTION

It is thereafter an object of the present invention to provide a nosepiece assembly adapted to be attached interchangeably to both a hand-held drill motor and a power feed drill motor for precisely drilling and countersinking a set of tightly spaced holes in a workpiece in a single operation.

This and other objects are provided, according to the present invention, by a nosepiece comprising a combination drill and countersink bit free to rotate within a surrounding sleeve. The spring-loaded sleeve extends telescopically from within a bushing and engages a tooling plate clamped to the workpiece. The sleeve inner diameter is chosen to be substantially equal to but greater than the diameter of the shaft of the drill/countersink bit, such as between 0.0005 and 0.0010 inches greater, in order to retain the bit and minimize bit wander after repeated or during heavy use. The sleeve engages the tooling plate via fingers extending from the sleeve toward the tooling plate. The fingers are located wholly within the cylinder defined by the outer diameter of the sleeve so that closely spaced holes may be drilled and countersunk.

In operation, an operator uses a tooling plate, such as a drill plate, to accurately and repeatably guide the drill to and into a structural assembly to enable repeatable and accurate fabrication of holes and countersinks in the structural assembly workpiece. The drill plate is first clamped to the structural assembly workpiece. The nosepiece assembly is attached to a drill motor, with the drill/countersink bit captured by a drill chuck, and the sleeve fingers then engage tooling slots or equivalent features in the tooling plate. The drill/countersink bit portion of the nosepiece assembly is then impelled toward the tooling plate and the workpiece, by force supplied by either the operator or by a power feed unit, as the sleeve retracts. While the engagement of the tooling plate by the sleeve fingers holds the drill in alignment, the drill cutting surface of the drill/countersink bit first cuts a hole in the workpiece and, as the bit continues forward, a countersink concentric with the hole is cut by the countersink cutting surface.

As the drill/countersink tool is used repeatedly and under heavy loading, any tendency of the drill/countersink bit to wander is restrained by the close fit of the shaft of the bit within the sleeve. Preferably, the inner surface of the sleeve is hardened by heat or other treatment or is coated with a lubricant to reduce wear on the bit and the sleeve.

After the drill and countersink have been cut, the operator backs the bit out of the hole and the nosepiece disengages from the tooling plate. The operator is then free to cut additional holes and countersinks according to the drill pattern defined by the tooling plate. The holes may be spaced as closely together as the geometry of the sleeve's tooling plate engagement fingers permits.

The nosepiece assembly of the present invention overcomes the size, weight, hole accuracy, and interchangeability deficiencies of conventional drill and countersink fabrication tools by providing a nosepiece assembly comprising a combination drill and countersink bit retained within a surrounding sleeve. The sleeve extends telescopically from within a bushing and engages a tooling plate clamped to the workpiece via fingers extending from the sleeve toward the tooling plate. The fingers are located wholly within the cylinder defined by the outer diameter of the sleeve so that closely spaced holes may be drilled and countersunk.

BRIEF DESCRIPTION OF THE DRAWINGS

FIG. 1 illustrates the use of a drill tool including a drill/countersink nosepiece assembly to cut holes and countersinks in a structural assembly through a tooling plate.

FIG. 2 is a perspective view of a drill/countersink nosepiece assembly.

FIG. 3 depicts a partial cross-section of a drill/countersink nosepiece assembly.

FIG. 4 is a detail perspective view of the fingers of a drill/countersink nosepiece assembly engaging slots in a tooling plate.

FIG. 5A is a cross-sectional view depicting the drill/countersink nosepiece assembly, the tooling plate and the drill motor before engagement with the tooling plate.

FIG. 5B is a cross-sectional view depicting the drill/countersink nosepiece assembly with the tooling plate engaged.

FIG. 5C is a cross-sectional view depicting a hole being drilled in a structural assembly workpiece by the drill/countersink nosepiece assembly.

FIG. 5D is a cross-sectional view depicting a countersink being cut in a structural assembly workpiece by the drill/countersink nosepiece assembly.

DETAILED DESCRIPTION OF THE PREFERRED EMBODIMENTS

Figure 5A:
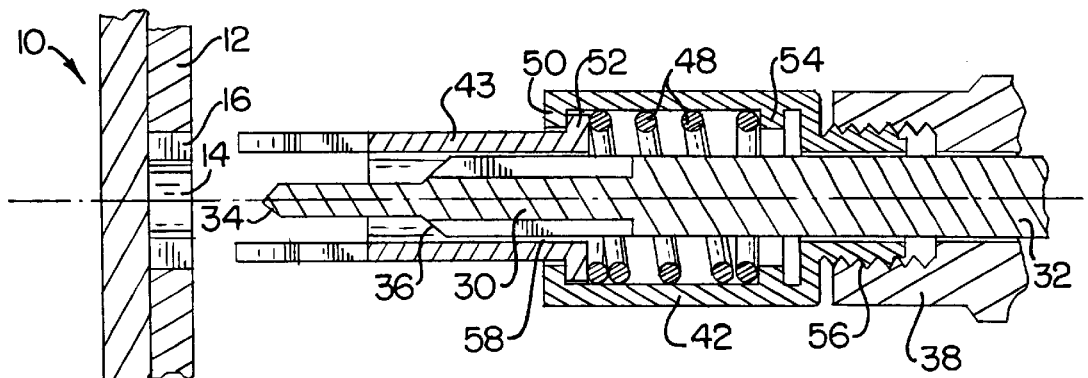
FIGS. 5A, 5B, 5C and 5D illustrate the use of a drill/countersink nosepiece assembly with a drill motor to drill a hole and a countersink in a single operation.

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Structural assembly 10 in aircraft and other equipment is typically constructed of metal, ceramic or graphite/epoxy laminate materials. Holes, countersinks or other features in structural assembly 10 may be repeatably and precisely fabricated with the aid of a tooling plate 12 which defines tooling plate holes 14 through which a drill or other fabrication tool may be guided. Tooling plate 12 is typically constructed of a very durable material and may be re-used to repeatably fabricate a common hole pattern through a plurality of structural assemblies 10, such as on an aircraft assembly line.

In order to repeatably and precisely fabricate holes or other features, tooling plate 12 is preferably clamped to or otherwise held securely against structural assembly 10 by wedgelocks or other fasteners. It is intended that a cutting tool, such as a drill/countersink bit 30 retained by drill chuck 22 of drill motor 20, is to be guided through tooling plate hole 14 to fabricate a hole, countersink or other feature in or through structural assembly 10. Drill/countersink bit 30 includes a first cutting surface, such as drill cutting surface 34, and a second cutting surface, such as countersink cutting surface 36. Drill/countersink bit 30 is precisely located relative to tooling plate 12 and structural assembly 10 by the engagement of spring-loaded nosepiece 40 with engagement slots 16 of tooling plate 12 located near tooling plate hole 14. Alternatively, drill/countersink bit 30 may be precisely located relative to tooling plate 12 by other engaging means. Bushing 38 of nosepiece 40 is attached to the fixed (non-rotating) housing 21 of drill motor 20, while drill/countersink bit 30 is tightly held in drill chuck 22. Sleeve 42 of nosepiece 40 is retained within bushing 38 so that sleeve 42 telescopically retracts against biasing means, such as compressed spring 48, as drill motor 20 forces drill/countersink bit 30 against and through structural assembly 10.

After fabricating the hole or other feature through tooling plate hole 14, the drill motor 20, drill/countersink bit 30 and nosepiece 40 may be moved to engage other tooling holes in tooling plate 14 and the fabrication process may be repeated through those other tooling holes while tooling plate 12 remains secured to structural assembly 10. The set of holes or other features defined by tooling plate 12 may be replicated on multiple structural assemblies 10 in a production assembly line environment by reusing tooling plate 12, which is preferably constructed from a durable and wear-resistant material.

Nosepiece 40 of the present invention is preferably adapted to be attached to the fixed (non-rotating) housing of either a hand-held drill motor unit or a power feed drill motor unit so that the assembly may be quickly interchanged with a variety of drill motor units in a production environment. Hand-held drill motor units to which the nosepiece 40 of the present invention has been adapted for use include Atlas Copco model no. LVS24H045-40. Power feed drill motor units to which the nosepiece 40 of the present invention has been adapted for use include Cooper Doler model no. 80-068-02.

In the preferred embodiment, shown in FIGS. 2 and 3, bushing 38 comprises a generally tubular structure symmetrical about the axis of drill rotation and is made from aluminum or other suitable material. Bushing 38 is adapted to be attached to the housing of drill motor 20 by way of bushing threads 56 or other equivalent means. Spring 48 is retained at one end of bushing 38 by spring stop 54 and at the other end of bushing 38 by sleeve 42. Spring 48 is preferably biased slightly into compression when sleeve 42 is fully extended. Bushing 38 preferably includes inward-extending bushing lip 50 to retain sleeve 42 by way of interference with outward-extending sleeve lip 52.

Sleeve 42 comprises a generally tubular structure symmetrical about the axis of drill rotation and is made from a very hard material such as steel. The diameter of sleeve inner surface 58 is preferably just slightly larger than the diameter of bit shaft 32, such as between 0.0005 and 0.0010 inches larger, and is very tightly toleranced, such as to ±0.0005inches. The surface finish of sleeve inner surface 58 is preferably very smooth, such as at least a surface finish of 16 RMS. To withstand repeated contact with rotating drill/countersink bit 30, sleeve inner surface 58 is preferably hardened such as by heat treatment or chemical treatment. Alternatively, sleeve inner surface 58 may be protected from rotating drill/countersink bit 30 by a lubricant such as a dry graphite powder, a liquid lubricant or the like.

Bit shaft 32 of drill/countersink bit 30 is inserted through sleeve 42 and bushing 38 of nosepiece 40 and firmly retained in drill chuck 22, which is a conventional drill chuck within drill motor 20. The position of drill/countersink bit 30 relative to that of sleeve 42 is set by the extent by which bit shaft 32 is inserted into drill chuck 22 and is chosen with regard for the thickness of tooling plate 12, the position of countersink cutting surface 36 relative to that of drill cutting surface 34, the depth of the hole or feature to be cut in structural assembly 10, and the geometry of fingers 46 relative to that of engagement slots 16.

The tight fit of drill/countersink bit 30 within sleeve 42 is critical to the improved function of the nosepiece 40 of the present invention. In operation, fingers 46 engage engagement slots 16 to prevent rotation, and drill motor 20 and drill/countersink bit 30 are impelled forward into structural assembly 10 through tooling plate 12, either through manual force against a hand-held drill motor unit or through the force supplied by a power feed drill motor unit. Spring 48 compresses further as sleeve 42 retracts into bushing 38 and maintains the engagement force of fingers 46 into and against engagement slots 16. With repeated heavy use or under heavy loads during the fabrication of features in hard materials, a conventional drill/countersink bit would tend to wander about or otherwise depart from its original axis of rotation. This tendency to wander is restrained in nosepiece 40 of the present invention by means for retaining drill/countersink bit 30, such as by corrective contact between drill/countersink bit 30 and sleeve inner surface 58, resulting in improved feature location and size accuracy.

A detailed depiction of the geometry of the preferred nosepiece engagement mechanism is provided by FIG. 4. In order to permit close spacing between adjacent holes in structural assembly 10, the maximum distance of fingers 46 and engagement slots 16 from the center of tooling plate hole 14 must be minimized. In the nosepiece 40 of the present invention, fingers 46 are located wholly within the infinite cylinder defined by sleeve body 43 of sleeve 42. Preferably, fingers 46 comprise two opposing fingers symmetrically located about the axis of drill rotation and extending from sleeve body 43 toward and into engagement slots 16. Alternatively, the engagement mechanism may comprise a single finger, a plurality of fingers, or some other engagement means equivalent to the foregoing located within the infinite cylinder defined by sleeve body 43. A further alternative engagement mechanism may comprise magnetized fingers for engaging a tooling plate 12 made of steel or other suitable metal.

Figure 5B:
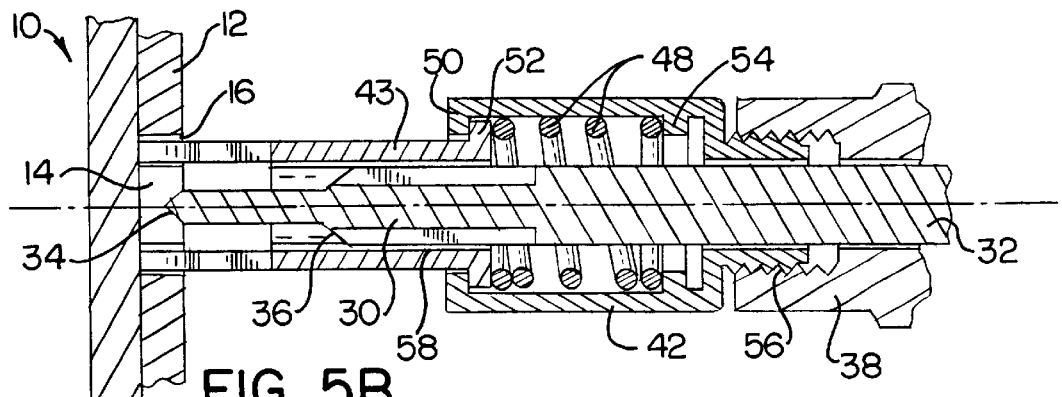
Figure 5C:
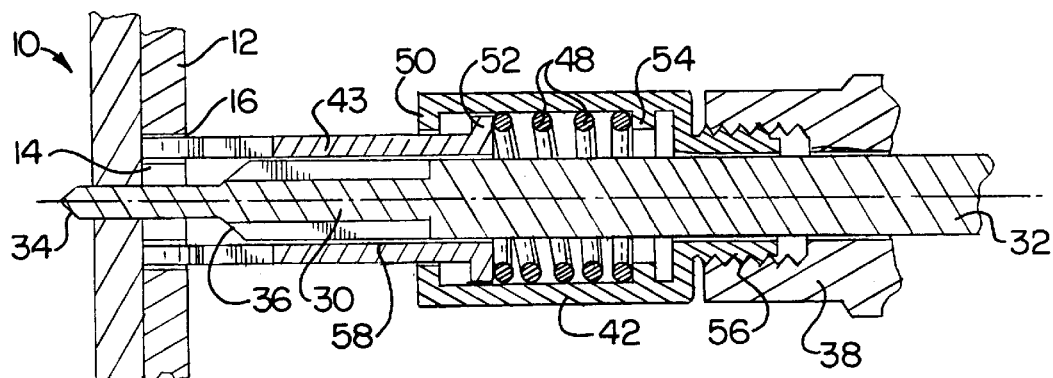
Figure 5D:
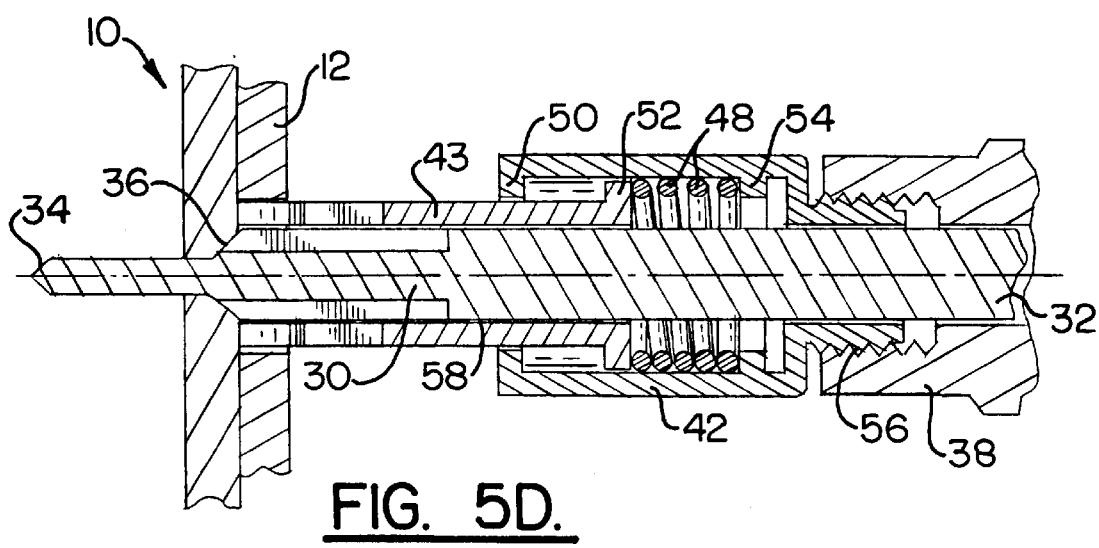

Operation of the preferred embodiment of the present invention is depicted in FIG. 5. In Figure 5A, drill/countersink bit 30 has been inserted into drill chuck 22 and nosepiece 40 has been attached to housing 21 of drill motor 20 in preparation for drilling and countersinking operations. In FIG. 5B, fingers 46 have engaged engagement slots 16 in tooling plate 12 and drill/countersink bit 30 has been inserted into tooling plate hole 14, but the assembly has not been impelled forward (spring 48 has thus not been further compressed) and drilling and countersinking operations have not commenced. In FIG. 5C, the assembly has been impelled forward so that drill cutting surface 34 has cut into structural assembly 10 and spring 48 is partially compressed to maintain the force of the nosepiece assembly against tooling plate 12. In FIG. 5D, the assembly has been impelled further forward so that countersink cutting surface 36 has begun to form a countersink about the hole in structural assembly 10 and spring 48 is almost fully compressed.

In summary, the nosepiece assembly of the present invention comprises a combination drill and countersink bit retained within a surrounding sleeve. The sleeve extends telescopically from within a bushing and engages a tooling plate clamped to the workpiece via fingers extending from the sleeve toward the tooling plate. The fingers are located wholly within the cylinder defined by the outer diameter of the sleeve so that closely spaced holes may be drilled and countersunk. The nosepiece assembly thus overcomes the size, weight, hole accuracy, and interchangeability deficiencies of conventional drill and countersink fabrication tools.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A nosepiece assembly adapted to be attached to a drill motor for drilling and countersinking a hole in a workpiece in a single operation, the nosepiece assembly comprising:

a bushing adapted to be operably connected to the drill motor;

a sleeve extending between first and second opposed ends, wherein the outer diameter of said sleeve defines an infinite cylinder, wherein said sleeve is telescopically extended from said bushing, wherein the second end of said sleeve is retained within said bushing and the first end of said sleeve extends beyond said bushing and comprises at least one finger extending toward the workpiece from the first end of said sleeve, said at least one finger located wholly within said infinite cylinder; and a drill/countersink bit adapted to be received by a drill chuck operably connected to the drill motor, said drill/countersink bit extending through said bushing and said sleeve so as to engage the workpiece, said drill/countersink bit having a first cutting surface for drilling a hole in the workpiece and a second cutting surface, concentric with said first cutting surface, for cutting a countersink in the workpiece during a single operation.

2. A nosepiece assembly according to claim 1 wherein said at least one finger comprises two opposed fingers.

3. A nosepiece assembly according to claim 1 wherein said at least one finger comprises a plurality of fingers.

4. A nosepiece assembly according to claim 1 further comprising means for baising said at least one finger into contact with the workpiece during drilling and countersinking operations.

5. A nosepiece assembly according to claim 4 wherein said biasing means comprises a compressed spring.

6. A nosepiece assembly adapted to be attached to a drill motor for drilling and countersinking a hole in a workpiece in a single operation the nosepiece assembly comprising:

a bushing adapted to be operably connected to the drill motor;

a sleeve extending between first and second opposed ends, wherein the outer diameter of said sleeve defines an infinite cylinder, wherein said sleeve is telescopically extended from said bushing, wherein the second end of said sleeve is retained within said bushing and the first end of said sleeve extends beyond said bushing and comprises at least one finger extending toward the workpiece from the first end of said sleeve, said at least one finger located wholly within said infinite cylinder; and a drill/countersink bit adapted to be received by a drill chuck operably connected to the drill motor, said drill/countersink bit extending through said bushing and said sleeve so as to engage the workpiece, said drill/countersink bit having a first cutting surface for drilling a hole in the workpiece and a second cutting surface, concentric with said first cutting surface, for cutting a countersink in the workpiece during a single operation; and means for retaining said drill/countersink bit in alignment with the axis of said drill/countersink bit during drilling and countersinking operations.

7. A nosepiece assembly according to claim 6 wherein said at least one finger comprises a plurality of fingers.

8. A nosepiece assembly according to claim 6 further comprising means for biasing said at least one finger into contact with the workpiece during drilling and countersinking operations.

9. A nosepiece assembly according to claim 8 wherein said biasing means comprises a compressed spring.

10. A nosepiece assembly according to claim 6 wherein said drill/countersink bit comprises a shaft, wherein said sleeve has an inner surface, and wherein said retention means comprises interference between said shaft and said inner surface of said sleeve, said shaft having a diameter no less than the diameter of said second cutting surface and between zero and 0.002 inches less than the diameter of said inner surface of said sleeve.

11. A nosepiece assembly according to claim 10 wherein said inner surface of said sleeve has been hardened.

12. A nosepiece assembly according to claim 10 wherein said inner surface of said sleeve has been lubricated.

* * * * *

UNITED STATES PATENT AND TRADEMARK OFFICE
CERTIFICATE OF CORRECTION

PATENT NO. : 5,947,654

DATED : September 7, 1999

INVENTOR(S) : Blankenship et al.

It is certified that error appears in the above-identified patent and that said Letters Patent is hereby corrected as shown below:

Column 7, line 10, "baising" should read --biasing--; line 17, after "operation" insert a comma (,).

Signed and Sealed this

Eighteenth Day of April, 2000

Attest:

Q. TODD DICKINSON

*Attesting Officer*           *Director of Patents and Trademarks*